Jan. 22, 1963   J. E. MAMBOURG ET AL   3,074,568
METHOD OF AND APPARATUS FOR FEEDING GLASS BATCH MATERIALS
Filed Feb. 5, 1958   6 Sheets-Sheet 1
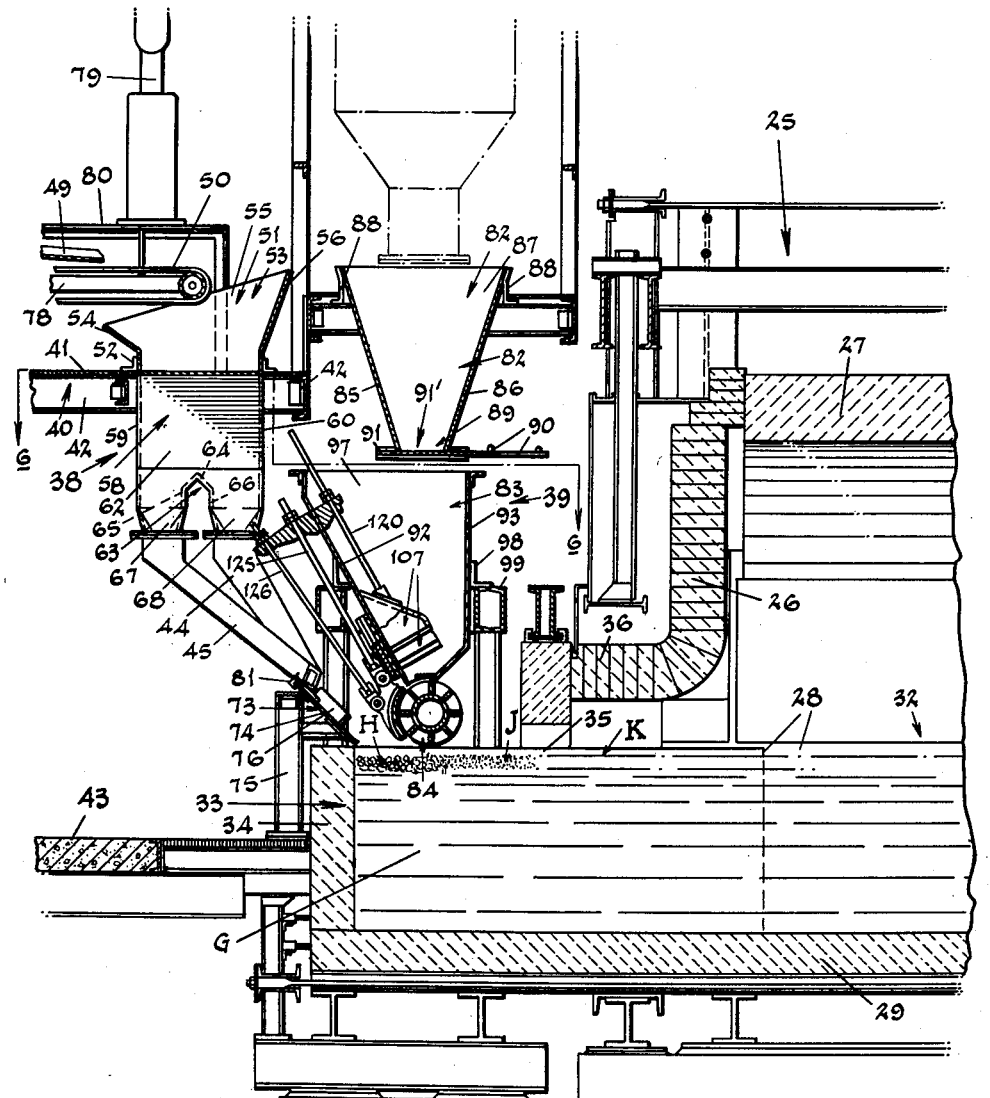
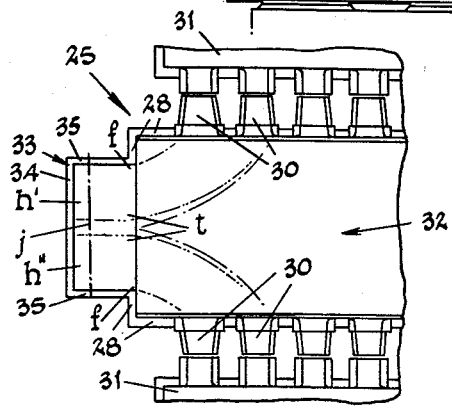
Fig. 1
Fig. 3
Fig. 2
INVENTORS
James E. Mambourg,
Anthony G. Sporer
BY and Charles E. Day
Nobbe & Swope
ATTORNEYS

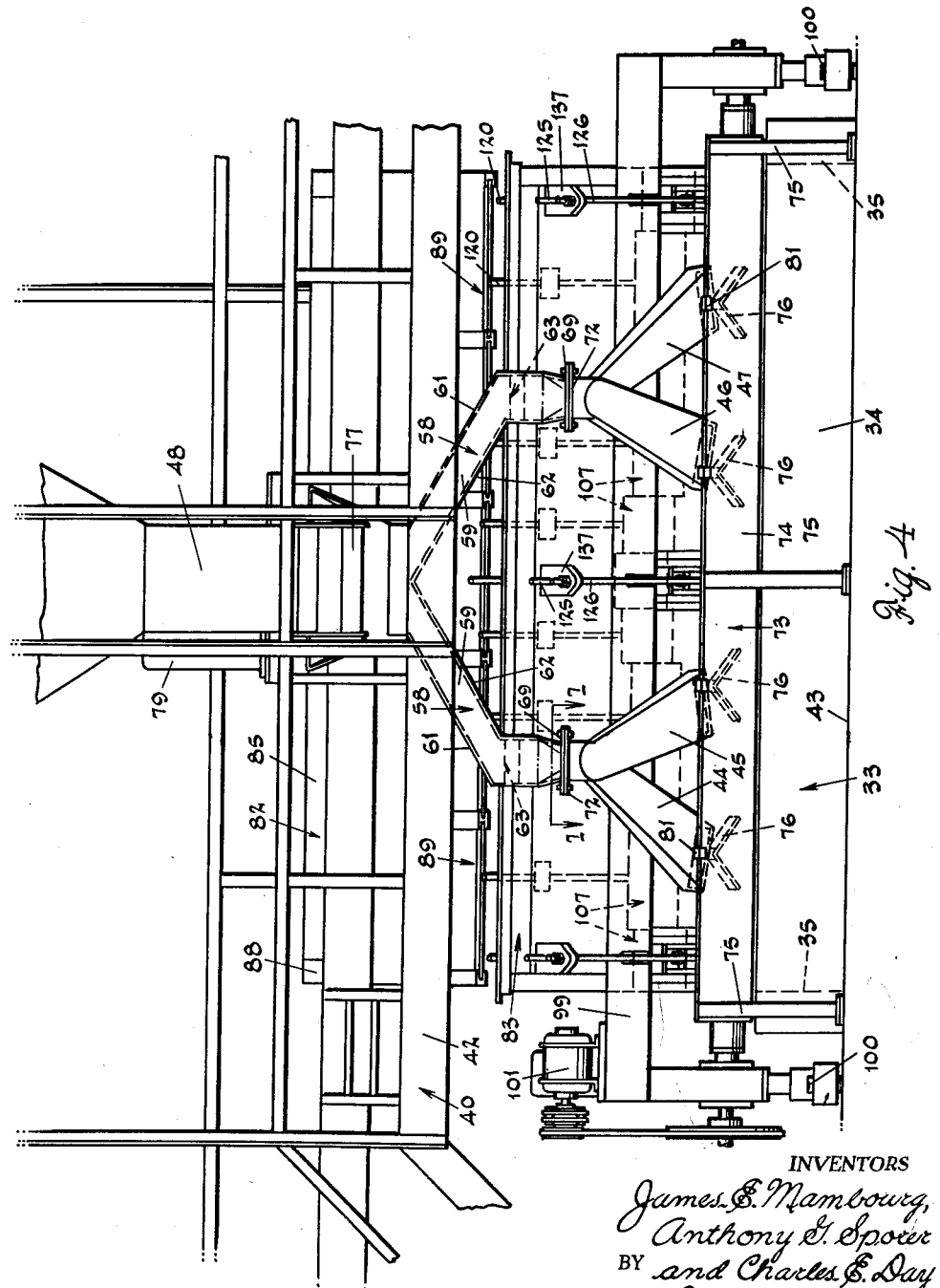

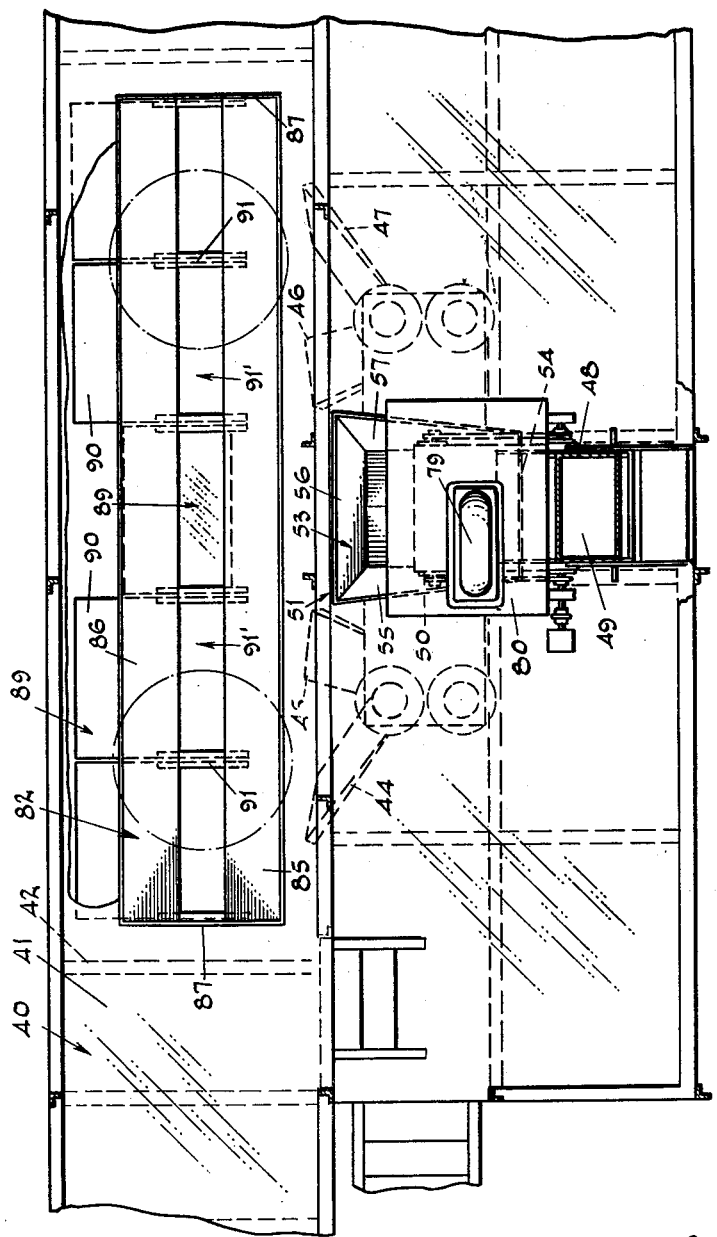

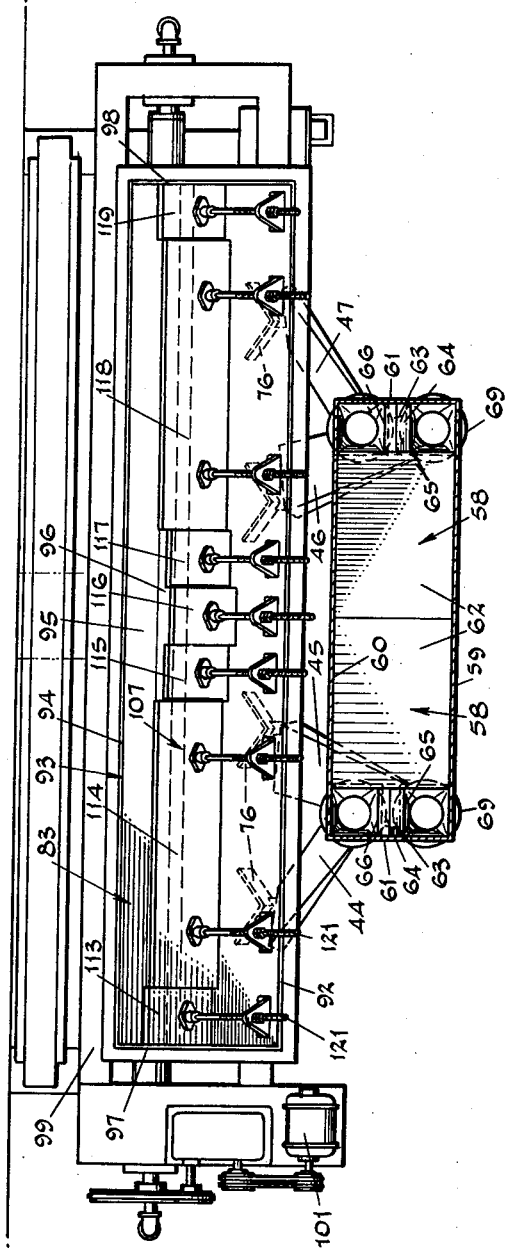

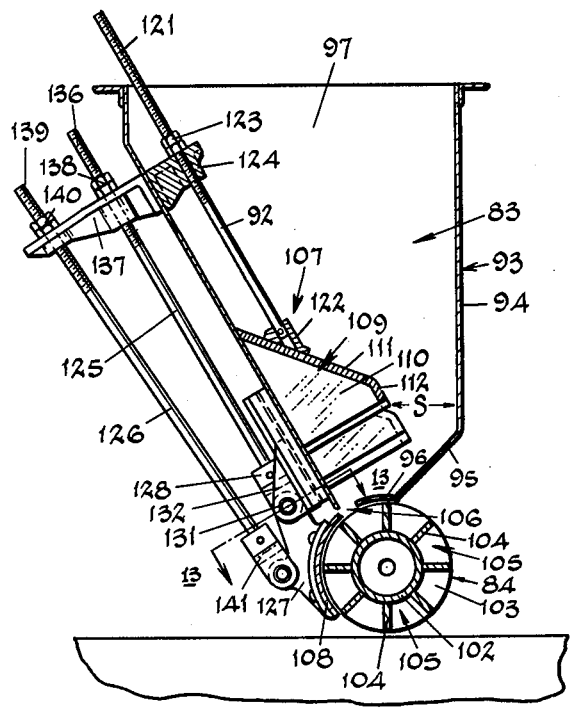
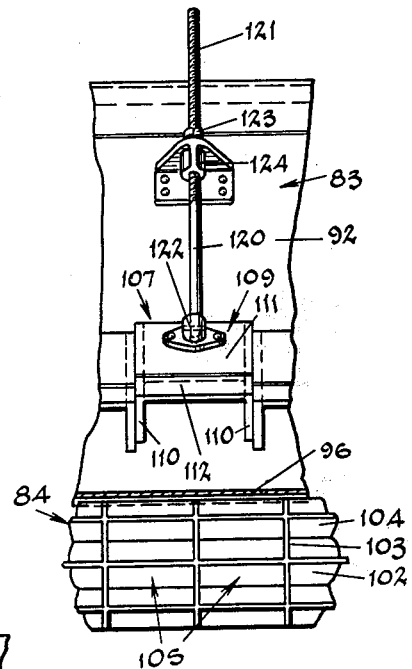
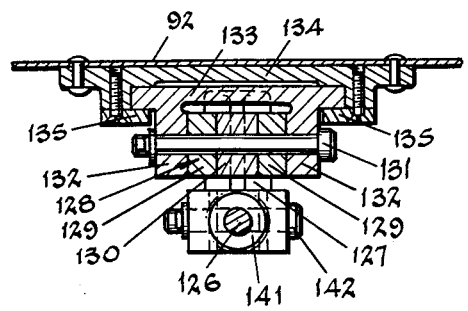
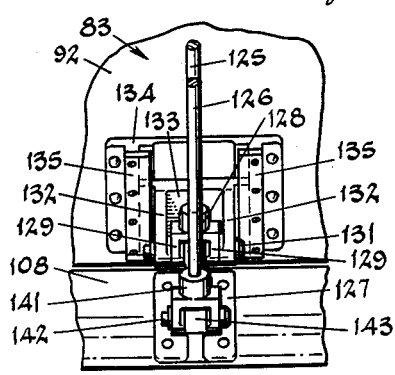

Jan. 22, 1963   J. E. MAMBOURG ET AL   3,074,568
METHOD OF AND APPARATUS FOR FEEDING GLASS BATCH MATERIALS
Filed Feb. 5, 1958   6 Sheets-Sheet 6
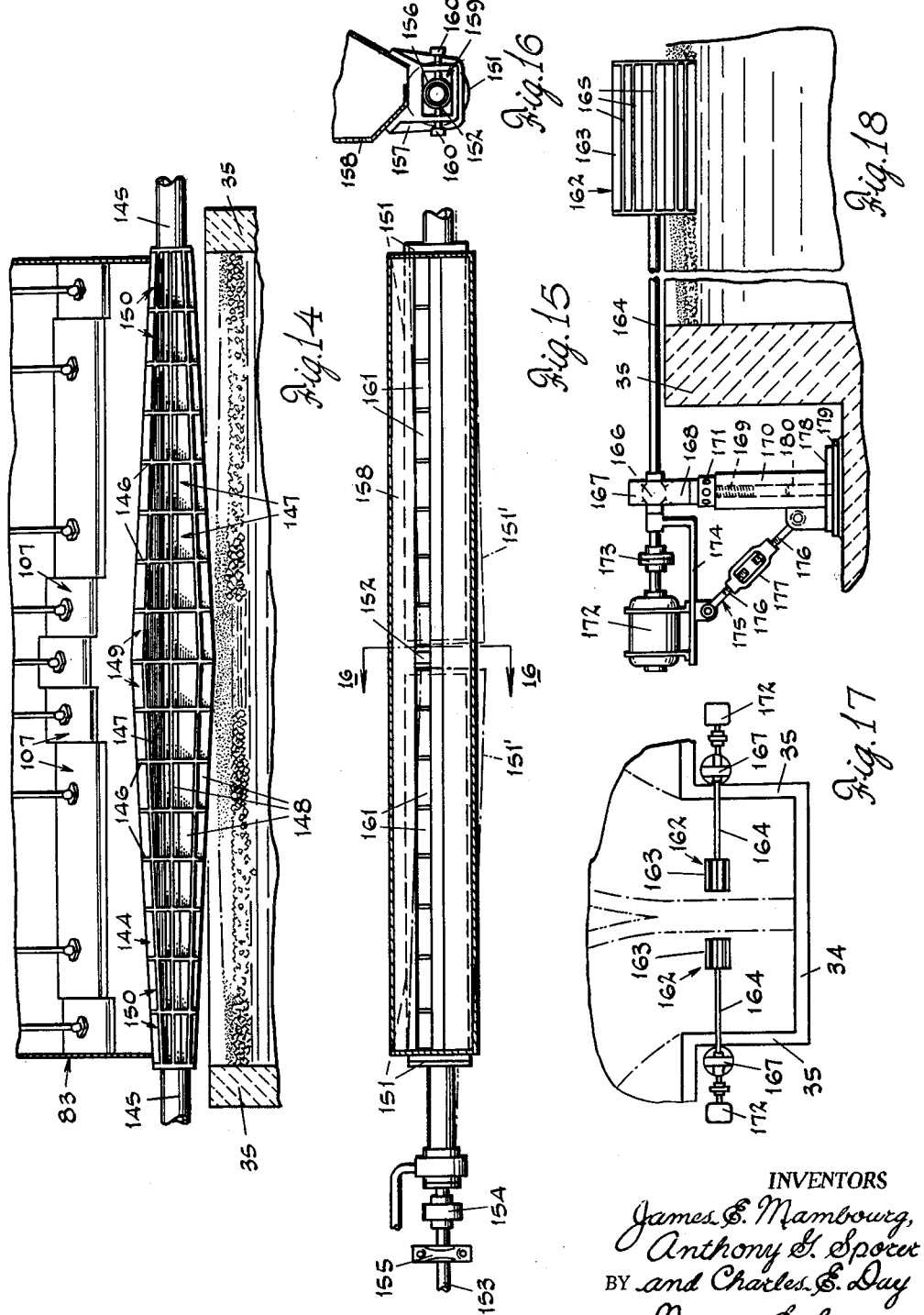
INVENTORS
James E. Mambourg,
Anthony G. Spore
BY and Charles E. Day
Nobbe & Swope
ATTORNEYS

United States Patent Office 3,074,568
Patented Jan. 22, 1963

---

3,074,568
METHOD OF AND APPARATUS FOR FEEDING GLASS BATCH MATERIALS
James E. Mambourg, Anthony G. Sporer, and Charles E. Day, Ottawa, Ill., assignors to Libbey-Owens-Ford Glass Company, Toledo, Ohio, a corporation of Ohio
Filed Feb. 5, 1958, Ser. No. 713,365
13 Claims. (Cl. 214—18)

This invention relates broadly to the art of glass making and more particularly to an improved method of and apparatus for directively feeding glass batch materials into a glass-melting furnace.

Broadly stated, our invention involves the use of suitable apparatus for the proportionate feeding or supplying of batch ingredients according to an improved method and whereby the constituent parts of the batch enter the furnace in a precisely determined strata relation and direction of movement.

Batch ingredients are, as is common knowledge, composed of raw pulverulent materials, such as sand, limestone (high calcium type), limestone (Dolomite), soda ash, carbon and rouge and a determined percentage of cullet which in composition is the same as the glass being produced. According to one known means of supplying these materials, the cullet is charged into the dog-house area of the furnace at a substantially continuous rate and the raw pulverulent materials in combined relation are then deposited on the stratum of cullet glass that is then moving forwardly in the upper area of the molten glass pool of the tank-furnace.

This invention proposes to improve the glass quality and at the same time to increase the rate of melting whereby to raise the efficiency and productivity of glass tank furnaces and, specifically, we have found that the rate of melting can be increased by proper control of the proportionate amounts of batch materials; of the manner in which the cullet is fed on and into the pool of molten glass; and of the formation of the raw batch material layer on the cullet stratum. When this is done, a better oriented pattern of flow or movement of glass making materials into the tank furnace is achieved and melting is carried on more rapidly and the quality of the resultant glass is notably improved.

The principal aim of this invention is, therefore, to provide an improved technique for feeding glass making materials to a glass-melting tank furnace and in which the direction and pattern of flow can be predetermined by the manner in which said materials are supplied to the feeding means.

Another object is to provide an improved procedure of the above character wherein the cullet material is fed into the entry end of the tank furnace in a basically predeterminedly and novel pattern.

Another object of the invention is to provide an improved method for feeding glass making materials wherein the raw pulverulent batch materials are supplied as a layer and at a proportionate rate to the cullet material and the lateral thickness of the batch layer is of a predetermined character both as to extent and as to variation.

Another object of this invention is to provide improved means for controllably varying the thickness of the glass batch stratum moving into a tank-furnace and simultaneously influencing the direction of such movement.

Another object is to provide an apparatus for feeding glass batch materials having means for rapidly varying the supply of such materials in a transverse direction to the direction of their movement into a tank-furnace.

A still further object is to provide in a glass batch feeding apparatus means for progressively increasing the thickness of the raw material layer inwardly from the outer limits thereof to form with the basic layer of cullet material a strata the formation of which predeterminedly will control the direction of its movement into a glass-melting tank-furnace.

A further and yet important object of this invention is to provide mechanical means for directively moving a strata of glass batch materials as they are supplied by apparatus of the above-stated character.

Other objects and advantages of the invention will become more apparent during the course of the following description, when read in connection with the accompanying drawings.

In the drawings, wherein like numerals are employed to designate like parts throughout the same:

FIG. 1 is a vertical, longitudinal section through the charging end of a typical glass-melting tank-furnace, showing batch feeding apparatus constructed according to the invention;

FIG. 2 is a diagrammatic plan view of the glass-melting tank-furnace of FIG. 1;

FIG. 3 is a diagrammatic illustration of a preferred arrangement of glass batch strata;

FIG. 4 is an end elevation of the batch feeding apparatus;

FIG. 5 is a plan view of the batch feeding apparatus;

FIG. 6 is a horizontal section of the apparatus below the level of FIG. 5 and as taken on line 6—6 of FIG. 1;

FIG. 7 is an enlarged detail view of the cullet feeding section of the apparatus, as taken on line 7—7 of FIG. 4;

FIG. 8 is a fragmentary, vertical, sectional view as taken on line 8—8 of FIG. 7;

FIG. 9 is a fragmentary detail view of the adjusting mechanism of the batch feeding apparatus;

FIG. 10 is an enlarged cross-sectional view of the batch feeding material apparatus;

FIG. 11 is an interior side elevational view of the apparatus as seen in FIG. 10;

FIG. 12 is an exterior side elevational view of the apparatus of FIG. 10;

FIG. 13 is an enlarged cross-sectional view as taken on line 13—13 of FIG. 10;

FIG. 14 is a plan view of a modified form of vane feeder for the raw materials of the glass batch;

FIG. 15 is a plan view of a further modified form of vane feeder for the raw materials;

FIG. 16 is a fragmentary detail view as taken on line 16—16 of FIG. 15.

FIG. 17 is a plan view of a pair of auxiliary motion impellers which may be employed with the batch feeding apparatus; and FIG. 18 is a transverse, vertical sectional view, showing one of the motion impellers in relation to the wall of the furnace.

Generally stated, by our invention we propose to control the formation of the stratum or strata of the glass batch materials and also the width and thickness thereof in a manner to cause the strata of batch materials to move into a tank-furnace from a straight substantially continuous path into diverging and angularly spread-out paths. In so doing, the batch strata as they enter the melting zone of the furnace spread laterally to immediately subject wide areas thereof to melting heat.

Referring now more particularly to the drawings, there is shown in FIG. 1 a typical continuous tank type of glass-melting furnace, generally designated by the numeral 25, and having an end wall 26, a cap arch 27, breast wall 28 and floor or bottom 29. As viewed in plan in FIG. 2, the tank-furnace 25 is equipped with conventionally arranged burner ports 30 in the side walls thereof, said ports being connected to regenerator chambers 31 and adapted to supply the flames of high temperature to reduce the batch material in the melting zone 32 to a molten consistency. In the construction of some typical tank-furnaces to which the batch materials are supplied in the nature of a combined blanket-like strata, the actual feeding, or dog-house, area 33 has a width, as illustrated in FIG. 2, of substantially more than half the width of the distance between the breast walls 28. The dog-house area may thus structurally be defined by an end wall 34 and integral spaced side walls 35, the bottom of this area usually being a continuation of the furnace bottom 29. The open area described by the walls 34 and 35 is to some extent covered by a low roof section 36 and a vertically movable, suspended wall or gate 37.

Arranged above the open area of the dog-house there is provided a glass cullet feeder, generally designated by the numeral 38, and a feeding apparatus for raw pulverulent batch materials indicated by the numeral 39. The feeder 38 is generally suspended from a conventional bridge platform 40, having a floor 41 carried by structural members 42, while the feeding apparatus is movably supported on the factory floor 43 in a manner to be hereinafter more fully set forth. Generally speaking, the feeder 38 is adapted to discharge scrap or cullet glass into the pool of molten glass G in an area adjacent the end wall 34 in such a manner as to create a substantially continuously formed layer or stratum H thereon. As this cullet stratum H moves forwardly, there is deposited on the surface thereof a substantially continuous layer or stratum J of the raw batch pulverulent materials.

Now, in accordance with most methods hereto known and/or practiced, the combined blanket-like strata K which is made up of the single layers H and J spans the open area of the dog-house between the side walls 35 thereof and, with substantially complete coverage of the molten glass pool G, is borne forwardly into the influence of the cross-fired flames in the melting zone 32.

However, in accordance with the present invention, the basic cullet stratum H is laid down in two substantially separate layers arranged as indicated at h' and h" in FIG. 2. Preferably there is formed or maintained a medial, open area of about two feet between these layers; this indicated distance being only in the nature of an example and not as a restrictive or limiting element of the present method.

As the cullet strata H are carried forwardly, the raw batch materials are deposited thereon as at j (FIG. 2) and it will be observed that the broken line j extends substantially from one side wall 35 to the opposite wall 35. In other words, the actual blanket of raw batch covers not only the separate cullet layers h' and h" but the medial, open area therebetween. Also, as seen diagrammatically in FIG. 3, the batch layer J has a relatively greater thickness in the central area than in the areas adjacent the walls 35. The purpose of providing a layer of this variable or progressively changing thickness will become apparent as the strata, designated K, passes beneath the gate wall 37 and roof 36 into the melting zone of the furnace.

The characteristic flow of molten glass into and through the melting zone is commonly known to be slower and more sluggish along the relatively cooler side wall areas than in the hotter middle area of the stream and this lends itself advantageously to the method of this invention since it utilizes the reduced rate of flow at the sides to initiate a pronounced divergent movement of all of the batch materials associated with the separate layers h' and h". The open area between the base layers tends to cause them to move in diverging directions and, what is even more important, the increased thickness of the upper layer in the central area of the moving stream produces an accelerating effect, acting against the decelerating effect along the edges, to promote diverging arcuate movements. Thus, as the split-blanket or separate adjacent layers approach the areas at which the side walls 35 join the front breast walls 28, there occurs an arcuate motion in each of the flowing streams or layers in which the outer areas f substantially operate as "fulcrums" to revolve the thicker areas t wheel-fashion whereby they are caused to swing radially and consequently are outwardly diverted so as to move forwardly in the hotter molten glass pool along angularly disposed paths generally directed toward areas between the first and second burner ports 30.

This produces a generally double fan effect (FIG. 2) or spreading of the batch materials across the width of the molten glass pool in the melting zone to the end that the thicker or greater volume portion of the batch will be carried into the hotter zone of the molten pool and the progressively thinner portions of the strata will be worked into the pool in the substantially cooler areas thereof.

As indicated above, the cullet feeder 38 is generally arranged above the outer end of the dog-house 33 and so that the delivery chutes 44, 45, 46 and 47 thereof are located slightly above the end wall 34. More particularly, the feeder 38 includes a hopper 48 (FIG. 4) that is conventionally supplied from cullet bins (not shown); a vibratory feed pan 49, a belt conveyor 50 and a delivery stack 51 which is substantially centrally disposed with reference to the dog-house. The above components of the cullet feeder are mounted, in one way or another, on the bridge floor 41 and the stack 51 is provided with suitable angle bases 52 so as to be supported in an opening therein.

The upper end of the stack is equipped with a funnel portion 53 formed by divergently related walls 54, 55, 56 and 57 while the lower end thereof approximates an inverted Y having two angularly disposed leg sections or ducts 58. As viewed in FIGS. 1 and 4, the walls 54 and 56 continue downwardly in parallel vertical planes to provide oppositely disposed wall portions 59 and 60 of each leg section. The walls 55 and 57 also are continued downwardly in vertical planes and then angularly outward to bridge the wall portions 59—60 and thus form the top wall 61 of each duct. On the other hand, the bottom or lower walls 62 of duct 58 are joined in the longitudinal axis of the stack 51 and accordingly operate to divide the cullet material falling thereupon.

The lower end of each duct 58 is further adapted to divide the descending cullet material and for this purpose is formed with a centrally disposed diverter 63 having an upper section 64 resembling an inverted V and integral vertically disposed walls 65 and 66. Two branch ducts 67 and 68 are thus formed by the terminal lower ends of the walls 59, 60, 61, 62, 65 and 66. These ducts are generally square in cross-section at their upper ends but are shaped substantially circularly at their lower ends which are equipped with flanged collars 69. The collars are each provided with arcuately arranged slots 70 in which are received bolts 71 that secure similarly flanged end collars 72 of the several chutes 44 to 47 inclusive.

The chutes 44—47 are tubular in form and generally rectangular in cross-section. Preferably each chute is progressively enlarged from the collars 72 so that the lower or discharge end of each chute is considerably flared to permit free and unobstructed fall of the cullet material onto an angularly disposed platform 73 that is mounted above the end wall 34 of the dog-house. The panel or plate 74 of the platform is supported by floor pedestals 75 in generally parallel relation to the dog-house wall and is provided with slidably mounted angle-plates 76, the purpose of which will be more fully hereinafter disclosed.

It is now believed apparent that the scrap glass or cullet is supplied in bulk from the usual storage bins above the bridge floor 40 and through the hopper 48 onto the feed-pan 49 which, by means of a well-known type of vibratory device 77, shakes the material more or less evenly onto the belt conveyor 50. The supporting frame 78 for the conveyor 50 is associated with a weighing mechanism 79 on a framework 80 and the mechanism 79 with the vibrator 77 in such a manner that the weight of cullet on the belt is more or less measured to the end that the activity of the vibrator is controlled to deliver desired quantities of cullet from the feed-pan 49. This determines the amount of cullet material fed to the tank-furnace in proportion to the pulverulent batch material. In being carried forwardly on the conveyor above the stack 51, the material is discharged onto the angularly disposed floors or walls 62 of the ducts 58. This equally divides the quantities of cullet which are then directed into the diverters 63. Here, the material is again divided and directed into the branch ducts 67 and 68 and thence to the chutes 44, 45, 46 and 47.

As previously set forth, the purpose of supplying the cullet in this novel manner is to definitely form a "split" layer on and into the molten pool in the dog-house and to actually lay down layers of cullet that are quite carefully spaced apart in the middle area of the dog-house. To this end, the chutes 44 and 47 are angularly disposed to carry material from the branch ducts 68 to areas of the dog-house adjacent to and inwardly from the side walls 35 thereof. Also the chutes 45 and 46 are disposed to direct cullet from the branch ducts 67. Although not restrictive to the spirit of the invention, we have found that a desired free-fall is afforded if the centrally disposed chutes 45 and 46 are associated with the branch ducts 67 located outwardly from the dog-house while the chutes 44 and 47 are connected to the inwardly located branch ducts 68.

In discharging onto the platform 73, the direction of movement of the cullet can further be controlled by the angle-plates 76. These are provided with hook-shaped bars 81 that are adapted to be placed over the outer edge of the platform panel 74. Accordingly, as shown in FIG. 4, the angle-plates 76 can be located adjacent the ends of the several chutes 44—47 and their position readily adjusted to determine the quantity of cullet distributed across the dog-house and particularly to form the split stratum h' and h" as described in connection with FIGS. 2 and 3. As the cullet particles leave the ends of the chutes, the actual amounts thereof entering the molten pool can be controlled by the total amount supplied to the stack 51; the lateral positions of the chutes 44 to 47 inclusive, and the position of the angle-plates 76 with reference to the ends of the chutes. This controlled manner of feeding assures that separate layers of cullet will be laid down on and into the molten glass pool and the naturally occurring natural forward motion covers this area except for the more or less definitely defined medially open area.

As the cullet stratum H moves forwardly, the raw pulverulent material is discharged from the feeder 39 in a substantially continuous supply which operates to create a transverse over-all blanket between the side walls 35. The means for controlling the rate and amount of discharge of the raw batch is defined by several novel embodiments which cooperate to, in a sense, measure said material from the moment of its delivery to a primary hopper 82 until it is passed through the main hopper 83 and is deposited by a rotary vane wheel 84 on the cullet stratum H. The purpose of these several and various important features is to create the pulverulent material layer or strata J with a central, relatively thick portion and with progressively, outwardly disposed portions of gradually lesser thickness. While shown in a diagrammatic manner, the general character of this stratum as indicated in FIG. 3 illustrates graphically the predetermined nature of the feeding operation.

The primary hopper 82 as shown in FIGS. 1 and 5, has inwardly sloping front and rear walls 85 and 86 and substantially vertically disposed side walls 87. Adjacent their upper ends the several walls are equipped with suitable braces or angle brackets 88 whereby the hopper 82 bodily is carried by the structure of the bridge floor 40. By means of plate-type valves 89, the effective area of the lower end of the hopper can be adjusted to vary the amount of material fed to the main hopper 83 of the feeder 39. For this purpose, each valve 89 comprises a substantially rectangular, flat sheet or plate 90 slidably carried along each of its longer margins by bracket 91, one component part of which is fixedly mounted on the front and rear walls 85 and 86 at the orifice 91' formed by their opposed lower ends. The plate valves 89 are adapted to enlarge or restrict the lower or orifice end 91' of the hopper 82 either transversely in a collective sense or longitudinally in the areas defined by their individual widths. As herein illustrated, five such plate valves are provided and in practical use the third or middle plate valve is usually positioned to close the central area of the orifice 91'.

The main hopper 83, which receives the downwardly discharging batch, essentially is comprised of an inwardly sloping front wall 92, a rear wall 93 having in part a vertically disposed wall portion 94, terminating in inwardly directed lower wall portions 95 and 96 and end walls 97. The upper ends of these walls can be suitably reinforced by angles 98. The hopper body is carried on a frame 99 that is movably supported on wheels 100 in a well-known manner. Also mounted on the frame 99 is a power unit 101 for operatively driving the rotary vane wheel 84. This wheel has an axially disposed hollow axle portion 102 that is adapted to be supplied with a suitable coolant such as water by means of conventional unions connected to the opposite ends of the axle. Arranged on the annular surface of this axle are regularly spaced disks 103 and radially disposed ribs 104 which provide a plurality of compartments 105. These are carried beneath the discharge orifice or lower open end 106 of the hopper 83, formed by the wall 96 and the lower end of the wall 92. The compartments 105, in continuous order, are filled with the raw batch in substantially measured quantities dependent, of course, upon the height and arrangement of the disks 103 and ribs 104.

The vane wheel 84, as seen in FIG. 1, is adapted to be rotated in a counter-clockwise direction and to thus convey the pulverulent batch from the hopper 83 as the compartments 105 pass the lower end 106 thereof in a circular direction until the wheel has been turned substantially one-half of a revolution when the contained material is discharged or falls onto the cullet stratum H. Now it is an important feature of this invention to provide means for predeterminedly controlling the actual amount of the raw pulverulent material as it falls substantially freely and of its own weight from the hopper 83. In so doing, the stratum J can be developed continuously in such a manner that the central area thereof will be thicker than either of the sides or outer areas as has been previously set forth. To accomplish this purpose, the hopper 83 is provided with a plurality of individually operable, so-called valve or gaging members, generally designated in their entirety by the numeral 107, and an arcuately formed closure plate 108.

As has been illustrated in FIGS. 10 and 11, the valve, or gaging members, 107, comprises essentially a generally triangularly formed body 109 having vertically disposed side walls 110 and an integral platform wall, having a major downwardly sloping surface area 111 and a short lower marginal surface 112 disposed at an angle thereto. More specifically, the surface or wall area 111 is disposed at a downwardly directed angle to the inclined plane of the front wall 92 of the hopper 83 while the lower wall surface 112 is herein shown as substantially parallel to said wall. As shown in FIG. 4 and more in detail in FIG. 11, the walls 110 of the individual valve members 107 are adapted to be closely positioned in surface aligned, slidable relation to provide a generally continuous surface by means of the several wall surfaces 111 on which the batch material is supported. Likewise, the marginal surfaces 112 afford a second substantially continuous surface which however controls the amount of material passing the valve members since the spaced relation between the edges of these surfaces 112 and the rear wall 93 determines the actual discharge opening of the hopper.

Accordingly, the amount of raw batch reaching the lower orifice 106 of the main hopper 83 depends upon the various dimensions of the open space defined by the surfaces 112 and the wall 93 (FIG. 10) as at S. As herein contemplated, the valve members are arranged at various elevations with reference to the lower orifice 106 in such relative positions that, as illustrated in FIG. 6, the proportionately predetermined supplying of the raw batch material to the tank-furnace can be initiated in the main hopper 83.

It may here be mentioned that this proportionately predetermined supply can be predicated on the fact that the raw materials in some instances contain a certain percentage of moisture which increases their density or weight. This tends to add force to the gravity or fall of the batch in the central area of the hopper and a lessening amount of downward force in the vicinity of the end walls 97. According to one typically desired proportion, the component members of the valve 107, identified at 113, 114, 115, 116, 117, 118 and 119, are located at in various depths, such as three (or more) centrally disposed relatively narrow valve members 115, 116 and 117, the relatively long members 114 and 118 spaced outwardly therefrom and similarly narrow valve members 113 and 119 defining the end areas of the valve member generally. Thus, the central member 116 is located slightly above the members 115 and 117 on each side thereof, the longer members 114 and 118 slightly lower and the outer end members 113 and 119 still lower in depth or elevation. This progressively restricts the "fall" of the material on each side of the member 116 and builds up a batch stratum which is noticeably crowned in its central area as is indicated in FIG. 3. As a consequence, the greatest fall of the material will be afforded in the central area and the proportionately lesser amount will occur outwardly toward the end areas.

To achieve this positioning and to carry out the adjustments which may from time to time become necessary, each valve member is supported by a rod 120 having a threaded portion 121 at its upper end. A rod is associated with each of the narrow valve members while the longer members 114 and 118 are equipped with two rods. Each rod 120 is secured to its respective valve member by means of a bracket 122 secured thereto. The upper, threaded ends 121 of the rods are equipped with lock-nuts 123, the lowermost of which being supported on a bracket 124 mounted on the hopper wall 92 adjacent the upper end thereof. By loosening the said lock-nuts and moving them along the threaded portion of the related rod, the valve body portion 109 can be raised or lowered to any elevational position of adjustment. And this will alter the spacing of the wall surface 112 from the hopper wall 93 thereby increasing or decreasing the amount of batch material passing therebetween. The actual amount of material reaching the orifice 106 may thus be accurately controlled and the fill of each compartment 105 of the vane wheel 84 will be directly proportional, outwardly from the center, to the position of the valve members 109 thereabove.

As the material reaches the orifice 106 of the hopper 83 and is received in the several compartments 105, a certain amount of control can also be exerted by means of the closure plate 108. As shown in the accompanying drawings, the proximate surface of this plate is relatively closely positioned with reference to the peripheral surface of the wheel 84. However, by means of a dual adjusting means, this plate 108 can be shifted substantially in two directions to influence the closure effect of said plate as the material within the compartments is carried therepast. These adjusting devices include a substantially vertically (with reference to wall 92) movable rod 125 and a rod 126 adapted to cause radial motion of the plate. Each of the rods 125 and 126 are, in one way or another, associated with brackets 127 secured to the rear surface of the closure plate 108 and equally spaced therealong.

Each rod at its lower end is equipped with a clevis 128 between the bifurcated ends 129 of which an ear 130 is received. The ear 130 is an integral part of each bracket 127 and, with the ends 129 of the clevis, is adapted to receive a support pin 131. The ends of each pin are carried in the lugs 132 of a slide plate 133. Each slide plate is mounted in a bracket 134 that is affixed to the outer surface of the hopper wall 92. Preferably the brackets 134 have gib plates 135 whereby the slide plates 133 will be guided during movement. Since the pins 131 collectively support the plate 108 by the ears 130, it will be apparent that any adjusting movement of the slide plate 133 will alter the relation of the closure plate 108 not only with reference to the vane wheel 84 but the adjoining edge of the orifice 106 of the hopper as well.

In the case of each rod 125, the upper end has a threaded portion 136 passed through a bracket 137 and equipped with lock-nuts 138. Each bracket 137 is affixed to the hopper wall 92. Outwardly of the rod 125 and in alignment therewith each bracket 137 is adapted to support the upper threaded end 139 of a rod 126 which carries lock-nuts 140. The lower end of each of these rods is pivotally connected by a clevis 141 and pin 142 to a second lug 143 of the brackets 127. Accordingly, the closure plate 108 is adapted to ready adjustment to vary the "fill" size of the compartments 105 or modify the compacting effect enforced on the batch material as the vane wheel 84 is revolving and the filled compartments are carried past the said closure plate.

The character of the pulverulent batch layer can also be effectively controlled by employing a vane wheel provided with compartments of varied volumes. This will more definitely, if desired, measure the amount of pulverulent material deposited on the cullet layer with the centrally disposed area of the batch material being thicker than the outwardly disposed end areas. Thus, a modified form of vane wheel of the character disclosed in FIG. 14 may be used in conjunction with main batch hopper 83 as above described. This wheel 144 has an axially disposed tubular axle 145 on which annular disks 146 are fixedly mounted in spaced relation. The diameter of each disk 146 outwardly from the centermost, is progressively smaller than the preceding one whereby planes across their peripheries would substantially describe a double frustum. Compartments 147 are formed between the disks by radially disposed rib plates 148 which are substantially wedge-shaped. The centrally disposed compartments, indicated at 149, will thus contain considerably more batch material than the outermost compartments indicated at 150 while the compartments therebetween will be of proportionately varied volumes. It is believed apparent that the character of the batch layer J in FIG. 3 can be accurately controlled and that, when a vane wheel of this modified character is employed with the valves 107 in the main hopper 83, the density of the batch material in each of the compartments together with the progressively increasing volume in the compartments from the ends to the center of the wheel 144 will quite definitely create a stratum of raw batch on the cullet stratum which varies from a thick, centrally disposed portion to the thinner areas in the vicinity of the walls 35.

A second modified form of vane wheel, as shown in FIGS. 15 and 16, induces a desired path of movement while laying down a layer of batch material in substantially a wedge-shaped pattern so that the central area will actually "lead" the outwardly disposed areas that are in the vicinity of the walls 35. Preferably the vane wheel of this modification is situated in closer proximity to the surface of the molten glass and this, together with the specifically modified manner of batch placement, tends to create a forwardly directed thrust along the plane of line normal to the axis of the vane wheel and in the centrally disposed margins of the "split" blanket of the cullet layer with a resultant impetus of sweeping movement of the total batch strata as it emerges from the dog-house area and enters the melting zone of the tank-furnace. Such a vane wheel may comprise a pair of axially non-aligned wheels 151 which are rotatively driven from a conventional source. The wheels 151, however, for the purpose herein disclosed, are interjoined by a universal joint 152 and are connected at their respective outer ends to substantially aligned support shafts 153 by universal joints 154. As shown at the left end of FIG. 15, the shafts are journaled in bearings 155. The centrally disposed joint 152 is rotatably carried by a bearing 156 that is supported in a bracket 157 attached to the opposed walls of the batch hopper 158. The bearing 156 is adapted to be adjustably shifted within the confines of a slot 159, formed in the bracket 157, by means of set-screws 160. Consequently, shifting of the bearing 156 to the left, as viewed in FIG. 16, will move the vane wheels 151 from a normally axially aligned relation to an angularly disposed relationship as indicated in broken lines 151' of FIG. 15. Batch material contained in and discharged from the compartments 161 at the inner ends of the wheels will be laid down on the cullet layer in advance of a theoretical line passing through the simultaneously discharged portions of the batch from the more outwardly disposed compartments of each wheel.

The forward movement of the batch strata may also be urged toward and into the actual melting zone of the tank-furnace in a manner to accelerate or accentuate the "flow" motion of the material into the desired divergently directed paths. This can be employed to increase the rate at which the cullet and pulverulent materials are added to the molten glass pool and consequently the amount of glass produced at the outlet or flow-spout end of the tank. For this purpose, impeller wheels may be located near the inner end of the dog-house and positioned so that the lower sections of their peripheries engage in and exert a certain amount of forwardly directed force on the batch strata.

As shown in FIGS. 17 and 18, impeller wheels 162 of this character are arranged above the side walls 35 and so that their body portions 163 are more or less submerged in the batch. These bodies may include a shaft 164 having radially disposed fins 165 fixedly secured on the periphery thereof. The wheels 162 are bodily mounted for adjustment as to height, or elevation, above the molten glass and for angular positioning in a horizontal as well as in a vertical plane. By so mounting the impeller wheels, the effective thrust imposed on the batch strata can be modified as to depth; as to the amount of depth in relation to the transverse width of the affected portion or area of the strata, and as to the directive effort of movement to be imposed on the movement of the strata. Thus, the impeller wheels 162 are suitably mounted for adjustment in a vertical plane in order that the actual width of fin entering the batch strata can be maintained; this affording a substantially accurate control on the force to be exerted by the revolving fins on the moving material.

The wheels can further be positioned at an angle in a vertical plane whereby the inner ends of the wheels can be submerged to a greater or lesser extent in the material strata than the outer ends thereof. Now, by angularly swinging the impeller wheels axially in a horizontal plane, the forward thrust thereby produced can be increased or decreased at the inner ends of the wheels. This last means of adjustment of course is intended to create or emphasize the swinging action of the divergently moving masses of the batch as hereinbefore described. In other words, the batch material in the centrally disposed and spaced apart margins of each split or divided blanket can be influenced to swing angularly with more rapidity toward the breast walls 28.

Additionally, the impeller wheels can be governed in the rate of their rotation to further influence the movement of the batch strata. Thus, when the wheels are located to engage the batch strata in the central areas, their faster rotation will be effective to urge the "split" blanket to spread out or apart as is desired. On the other hand, if the impeller wheels are located in closer relation to the side walls 35 and driven at a slower rate of speed than the normal rate of molten glass flow, this will inversely effect an accentuated movement of the more centrally disposed batch strata. In any event, the impeller wheels are adapted to be easily bodily positioned and/or driven with respect to the spaced batch strata in such a manner that novel formation of the cullet and dry batch strata hereinbefore described can be further aided or controlled.

For these purposes, the shaft 164 of each impeller wheel is journaled in a ball bearing 166 that is socketed in a clamp bracket 167. The bracket 167 forms the upper part of a support member 168 which is equipped with a lower, threaded and vertically disposed axle 169. The axle is contained in a pedestal 170 and may be provided with a threaded collar 171 mounted on the top of the base. By rotation of this collar, the support member 168 can be raised or lowered to effect the general elevation of the associated impeller wheel. Outwardly of the bearing 166, the shaft 164 is operatively joined to a motor 172 through a conventional coupling 173. The motor 172 is carried by a platform bracket 174 which is bodily supported on the pedestal 170 by means of an adjustable link 175 having threaded rods 176 and a turn-buckle 177 therebetween. While the link 175 may be structurally employed to support the platform bracket 174, it will be apparent that upon manipulation of the turn-buckle 177, the bracket 174 and the shaft 164, together with the motor 172 and the wheel 162 can be swung radially on the bearing 166 thereby angularly adjusting the impeller wheel in the vertical plane.

The pedestal 170 is provided with a base flange 178 that is carried on a fixed plate 179 secured to the factory floor and is rotatable thereon about the axis of a vertically disposed bearing post 180. By means, not shown, the base flange 178 is adapted to be "locked" in a position of adjustment or moved therefrom to bodily swing the pedestal 170 and particularly the impeller wheel 162 carried thereon, about the post 180 until the said impeller wheel is suitably angularly positioned with reference to the strata of batch material moving therepast and the extent of modified thrust to be imposed on the strata as a result of re-positioning of the wheels. Accordingly, the impeller wheels 162 adjacent the opposite side walls 35 of the dog-house can be readily located in axial relation and adjusted in elevation into alignment in the horizontal plane. As well, when adjustments are necessitated to variably control the manner or delivery rate of movement of the batch materials entering the tank-furnace, one or the other, or both, of the impeller wheels can be adjusted in its position to bring about the desired influence upon the flow of materials.

According to the disclosed novel features of this invention, it is now found possible to accurately direct the spreading of continuously fed batch materials into the melting zone of a glass tank-furnace and in more preferentially distributed masses. The formation of individual cullet layers at the inception of the total batch material strata assures that, by the divergent paths of movement thereby set up, the flow of these materials will spread over a greater surface area of the molten glass pool and subject them more easily and rapidly to the heat of the tank-furnace. Also, since the materials are introduced into the tank-furnace at a substantially continuous rate and in split blankets of controlled thickness than has been heretofore suggested, the tendency for the same to respond to the high temperatures is materially increased. This assures a rapid assimilation and reduction of the batch materials into the body of molten glass.

It is to be understood that the forms of the invention

We claim:

1. A method of feeding finely divided glass-making materials into a furnace containing a mass of molten glass and having an inlet end and a melting zone adjacent said inlet end, which comprises depositing a layer of said materials on said molten glass at the inlet end of said furnace, and advancing portions of said layer into said melting zone along arcuately diverging paths by depositing a second layer of finely divided glass making materials that has its greatest thickness in the middle onto said first mentioned layer.

2. An apparatus for delivering glass-making materials onto the surface of molten glass at the feeding end of a tank-furnace and advancing said materials forwardly into said furnace, in combination, means for supplying cullet material to the feeding end of the furnace in layers equally spaced medially from the longitudinal axis of said furnace, rotary means for supplying pulverulent batch materials in a transversely continuous layer on the surfaces of the spaced cullet layers, and means associated with said rotary means for controlling the thickness of said transversely continuous layer from the outer margins thereof to the medial area.

3. An apparatus for delivering glass-making materials onto the surface of molten glass at the feeding end of a tank-furnace and advancing said materials forwardly into said furnace, in combination, means for supplying cullet material to the feeding end of the furnace in layers equally spaced medially from the longitudinal axis of said furnace, means for supplying pulverulent batch materials, a pair of operatively associated wheels having compartments formed thereon for delivering the batch material to the feeding end of the furnace, means supporting said wheels for rotary movement, universal means interconnecting the wheels at their opposed inner ends, and means adjustably positioning said universal means to support said wheels for rotary movement in divergently disposed planes with reference to one another.

4. An apparatus for delivering glass-making materials onto the surface of molten glass at the feeding end of a tank-furnace and advancing said materials forwardly into said furnace, in combination, means for supplying cullet material to the feed end of the furnace in layers equally spaced medially from the longitudinal axis of said furnace, means supplying pulverulent batch materials, rotatably operable means for forming a transversely continuous layer of batch material over the surfaces of the spaced cullet layers in variable thickness, impeller wheels arranged in transverse axial alignment at the feeding end of the said furnace for inducing a change in rate of movement in defined areas of the strata of forwardly advancing glass-making materials, and means adjustably mounting the impeller wheels for positioning of the same relative to the strata of glass-making materials on the surface of the molten glass.

5. Apparatus for delivering glass making materials onto the surface of molten glass at the feeding end of a glass melting furnace and advancing said materials forwardly into said furnace, comprising in combination, means for supplying glass cullet to the feeding end of said furnace in layers equally spaced medially from the longitudinal axis of said furnace, and rotary means for supplying pulverulent raw batch materials in a transversely continuous layer on the surfaces of the spaced cullet layers, said rotary means including compartments increasing in volume from the outer ends to the central area thereof.

6. A method of feeding finely divided glass making materials into a glass melting furnace containing a mass of molten glass comprising, depositing first continuous layers of said materials in spaced side by side relationship on said molten glass, and then depositing a second continuous layer of said materials that has its greatest thickness toward the middle thereof over said first layers and the space therebetween, whereby the composite layer formed will advance into the furnace along diverging paths.

7. A method of feeding finely divided glass making materials into a glass melting furnace as defined in claim 6, wherein the first layers are made up of glass cullet and the second layer is made up of raw batch materials.

8. A method of feeding finely divided glass making materials into a glass melting furnace containing a mass of molten glass comprising, depositing first continuous layers of said materials in spaced side by side relationship upon said molten glass, and then depositing a second continuous layer of said materials on said first layers and the space therebetween, said second layer having a uniform thickness and being deposited by laying down continuous layers of said materials in adjacent side by side relationship along diverging lines upon said first layers and the space therebetween.

9. A method of feeding finely divided glass making materials into a glass melting furnace as defined in claim 8, wherein the second layer is deposited by laying down continuous layers of said materials in adjacent side by side relationship in a V configuration.

10. A method of feeding finely divided glass making materials into a glass melting furnace as defined in claim 9, wherein the point of the V is advanced into the furnace first.

11. A method of feeding finely divided glass making materials into a glass melting furnace as defined in claim 8, wherein the first layer is made up of glass cullet and the second layer is made up of raw glass batch materials.

12. A method of feeding finely divided glass making materials into a glass melting furnace containing a mass of molten glass comprising, depositing first continuous layers of said materials in spaced side by side relationship on said molten glass, and depositing a second continuous layer of said materials that is thicker in the middle than at the sides thereof over said first layers and the space therebetween, whereby the composite layer formed will advance into the furnace along diverging paths.

13. A method of feeding finely divided glass making materials into a glass melting furnace containing a mass of molten glass comprising, depositing first continuous layers of said materials in spaced side by side relationship on said molten glass, and then depositing a second continuous layer of said materials that is progressively thicker from the sides toward the middle thereof over said first layers and the space therebetween, whereby the composite layer formed will advance into the furnace along diverging paths.

References Cited in the file of this patent

UNITED STATES PATENTS

| | | |
|---|---|---|
| 2,175,541 | Probert | Oct. 10, 1939 |
| 2,178,418 | Brown et al. | Oct. 31, 1939 |
| 2,306,811 | Kennedy | Dec. 29, 1942 |
| 2,310,924 | Becker | Feb. 16, 1943 |
| 2,624,475 | Henry et al. | Jan. 6, 1953 |
| 2,711,837 | Henry et al. | June 28, 1955 |
| 2,773,611 | Henry et al. | Dec. 11, 1956 |

FOREIGN PATENTS

| | | |
|---|---|---|
| 162,739 | Australia | May 6, 1955 |